(12) United States Patent
Kanamaru

(10) Patent No.: US 11,518,323 B2
(45) Date of Patent: Dec. 6, 2022

(54) POWER SUPPLY SYSTEM AND VEHICLE INCLUDING THE SAME

(71) Applicant: TOYOTA JIDOSHA KABUSHIKI KAISHA, Toyota (JP)

(72) Inventor: Keisuke Kanamaru, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/349,338

(22) Filed: Jun. 16, 2021

(65) Prior Publication Data

US 2022/0009431 A1 Jan. 13, 2022

(30) Foreign Application Priority Data

Jul. 10, 2020 (JP) .............................. JP2020-119343

(51) Int. Cl.
| | | |
|---|---|---|
| *B60R 16/03* | (2006.01) | |
| *G08B 5/22* | (2006.01) | |
| *H01H 47/00* | (2006.01) | |
| *B60Q 9/00* | (2006.01) | |
| *H02P 27/06* | (2006.01) | |

(52) U.S. Cl.
CPC ............. *B60R 16/03* (2013.01); *B60Q 9/00* (2013.01); *G08B 5/22* (2013.01); *H01H 47/00* (2013.01); *H02P 27/06* (2013.01)

(58) Field of Classification Search
None
See application file for complete search history.

(56) References Cited

U.S. PATENT DOCUMENTS

| | | | | |
|---|---|---|---|---|
| 2015/0210173 A1* | 7/2015 | Funabashi | ............... | B60L 58/15 |
| | | | | 180/65.21 |
| 2015/0298568 A1* | 10/2015 | Mitsutani | ................ | B60L 50/62 |
| | | | | 180/65.21 |
| 2016/0046202 A1* | 2/2016 | Yamamoto | ............ | B60L 53/305 |
| | | | | 307/10.1 |
| 2019/0106002 A1* | 4/2019 | Götz | ....................... | B60L 53/22 |
| 2020/0007040 A1* | 1/2020 | Handa | ..................... | B60L 50/15 |
| 2021/0362604 A1* | 11/2021 | Salter | ...................... | B60K 6/26 |

FOREIGN PATENT DOCUMENTS

| | | |
|---|---|---|
| JP | H08-009551 A | 1/1996 |
| JP | 2004-103331 A | 4/2004 |
| JP | 2010-108807 A | 5/2010 |
| JP | 2011-109792 A | 6/2011 |

* cited by examiner

Primary Examiner — Jared Fureman
Assistant Examiner — Aqeel H Bukhari
(74) Attorney, Agent, or Firm — Oliff PLC

(57) ABSTRACT

When an outlet is shut off, an ECU monitors whether a restoration condition for restoring the outlet is satisfied. When the restoration condition is not satisfied, the ECU shifts a process to return. When the restoration condition is satisfied, the ECU restores the outlet for which the restoration condition is satisfied. As the restoration condition, a condition that an external device connected to the outlet is removed with the outlet being shut off or a condition that the external device connected to the outlet is removed and then the external device is connected to the outlet with the outlet being shut off can be adopted.

6 Claims, 5 Drawing Sheets

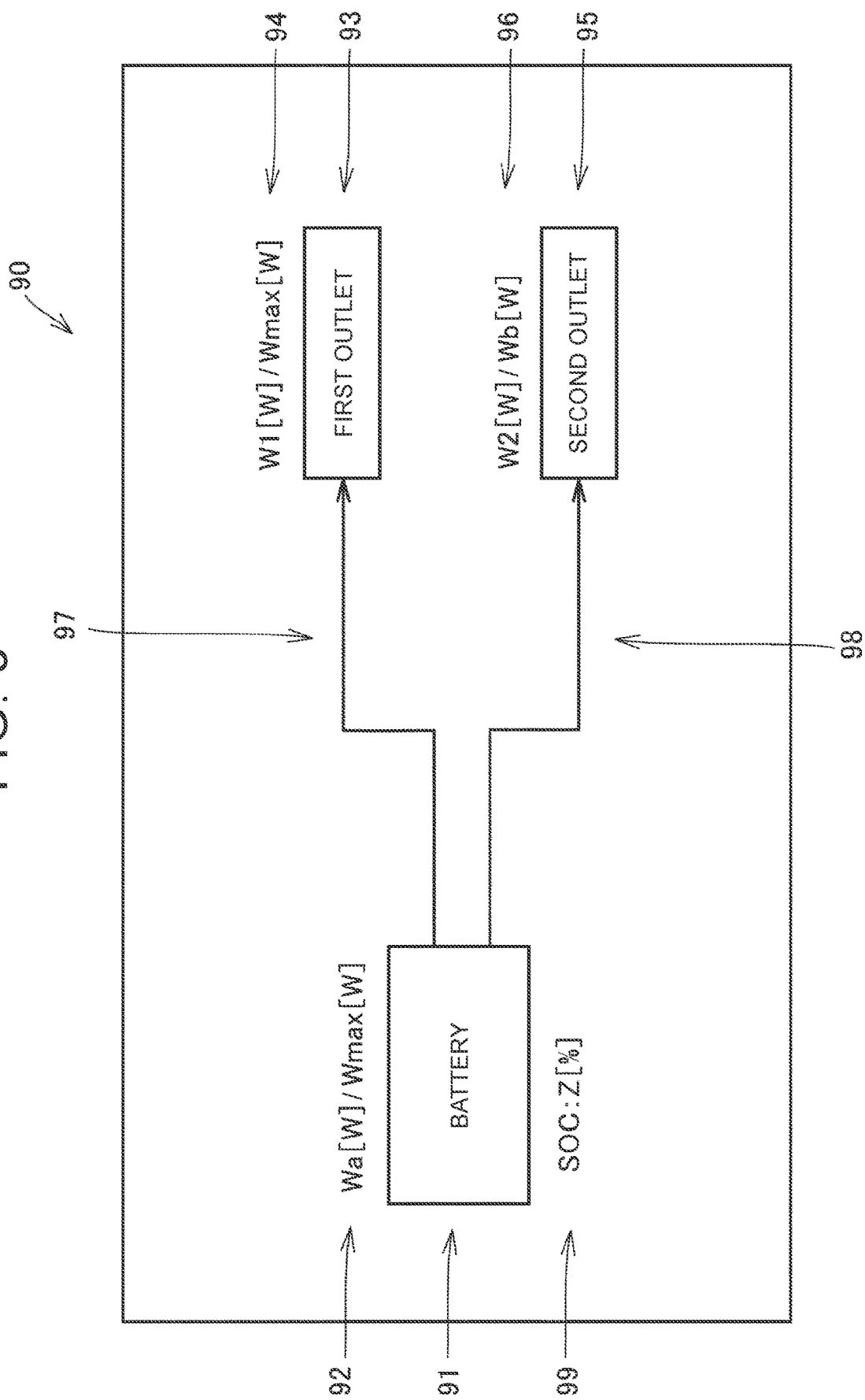

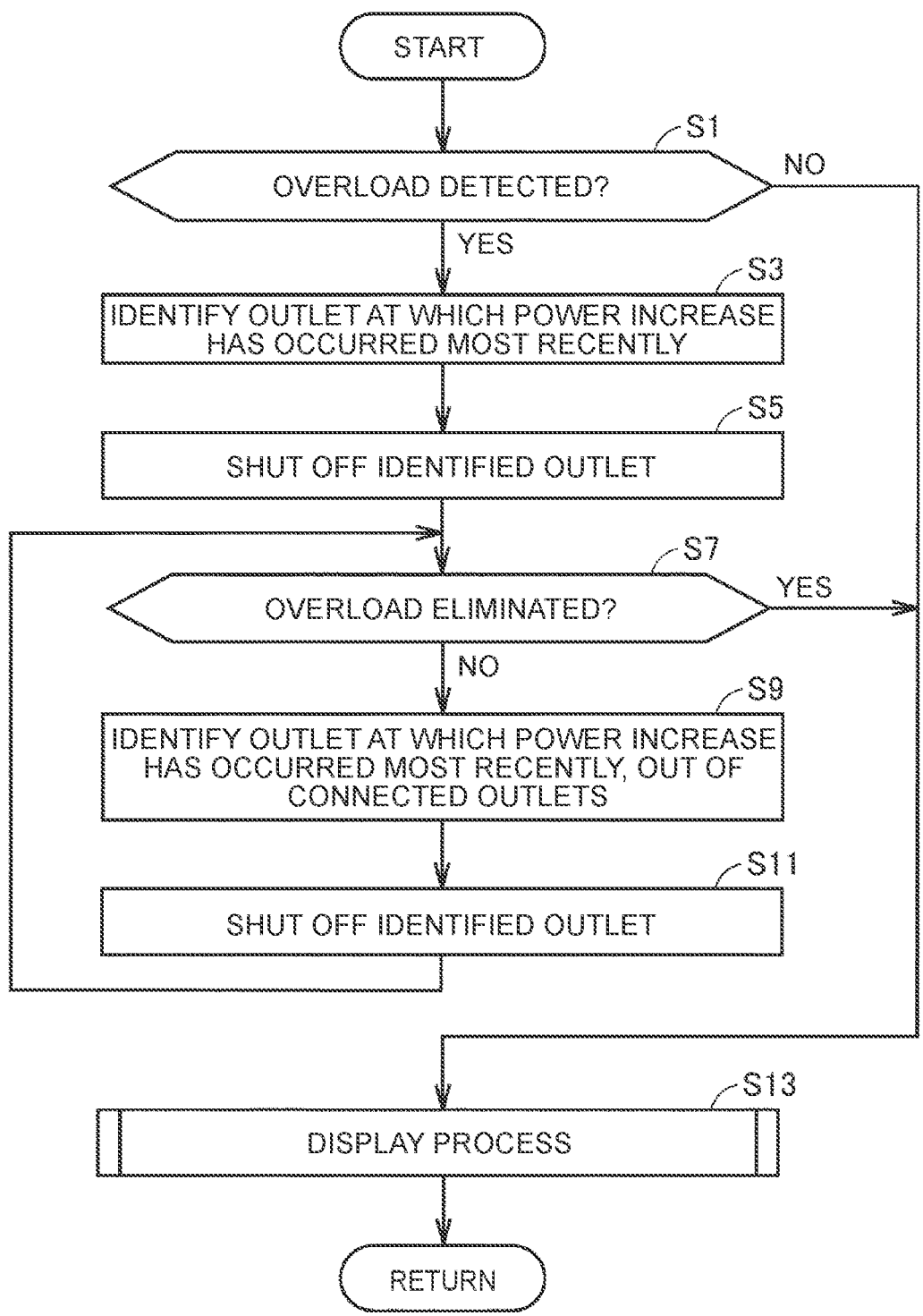

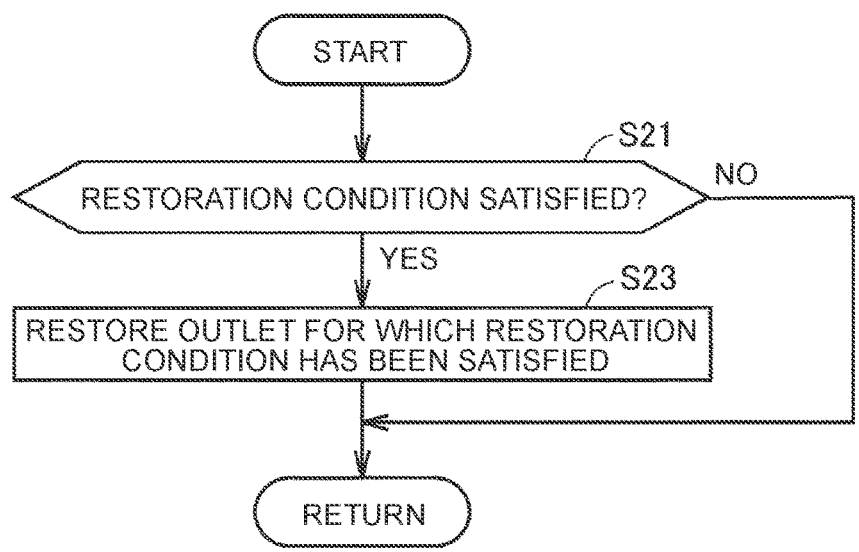
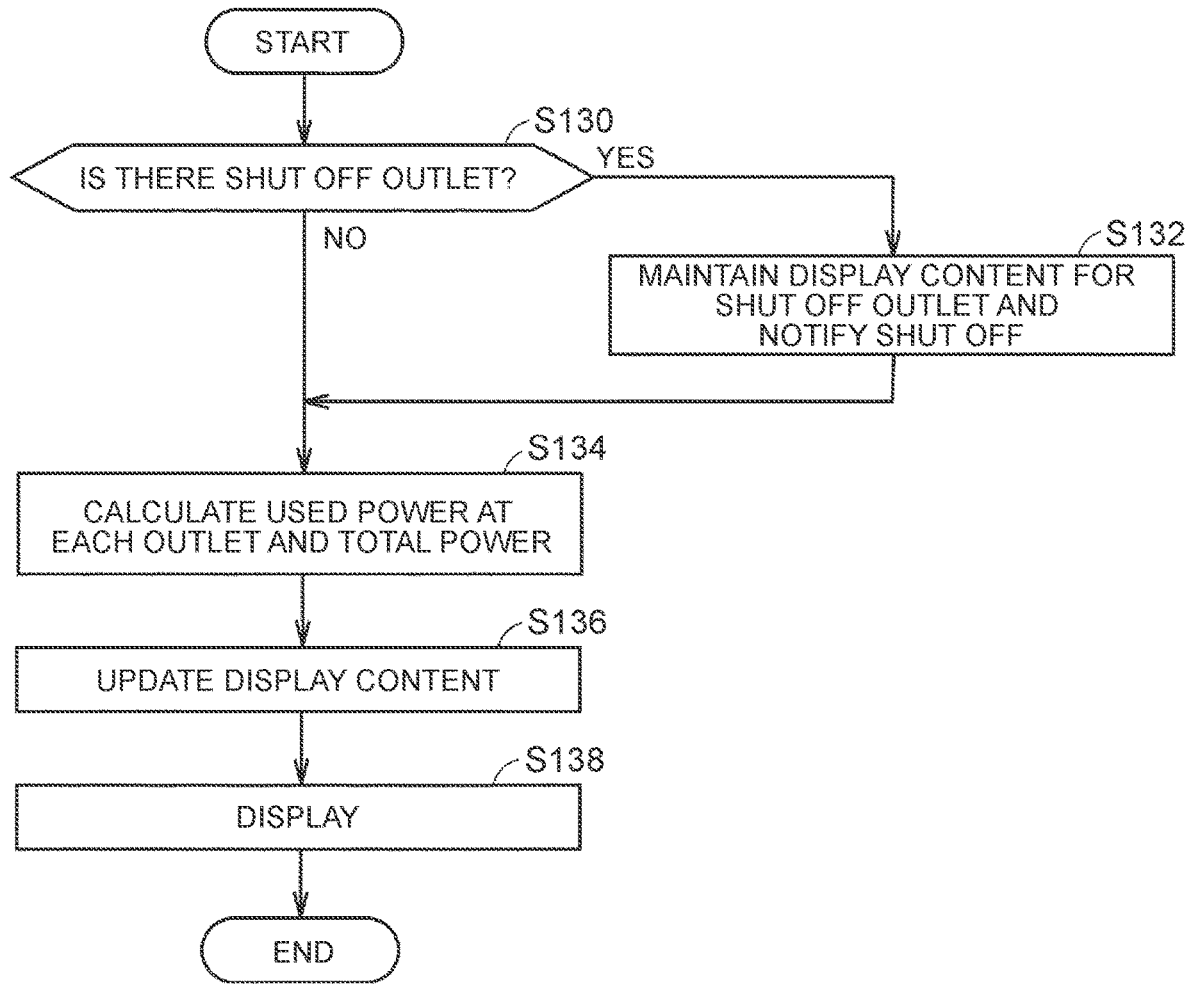

POWER SUPPLY SYSTEM AND VEHICLE INCLUDING THE SAME

CROSS-REFERENCE TO RELATED APPLICATION

This application claims priority to Japanese Patent Application No. 2020-119343 filed on Jul. 10, 2020, incorporated herein by reference in its entirety.

BACKGROUND

1. Technical Field

The present disclosure relates to a power supply system and a vehicle including the power supply system.

2. Description of Related Art

Japanese Unexamined Patent Application Publication No. 2010-108807 (JP 2010-108807 A) discloses a fuel cell power generation system including a fuel cell body, an independent operation outlet, an inverter that converts electric power generated by the fuel cell into alternating current (AC) power and outputs the AC power to the independent operation outlet, and an independent load circuit breaker provided between the inverter and the independent operation outlet. In the fuel cell power generation system, when the power supplied from the independent operation outlet to the external load becomes overloading, the inverter and the independent operation outlet (load) are disconnected by the independent load circuit breaker.

SUMMARY

In order to make the independent operation outlet usable again, it is required to connect the inverter with the independent operation outlet using the independent load circuit breaker to restore the independent operation outlet.

For example, it is conceivable that, as in the automatic restoring device disclosed in Japanese Unexamined Patent Application Publication No. 2004-103331 (JP 2004-103331 A), when an overload is detected, the circuit breaker is temporarily (about 10 seconds) shut off, and then the circuit breaker is connected to automatically restore the outlet. However, when the outlet is automatically restored, the stopped device (load) may suddenly operate at a timing not intended by the user.

Further, for example, it is conceivable to provide a reset switch for restoring the cutoff switch in the cutoff state to the connected state, as in the safety device for a large current device for home use which is disclosed in Japanese Unexamined Patent Application Publication No. 8-9551 (JP 8-9551 A). However, in this case, the cost for providing the reset switch is high.

The present disclosure has been made to solve the above issues, and an object thereof is to easily and appropriately resume power supply to an outlet when the power supply to the outlet is stopped due to a detection of overload.

(1) A power supply system according to an aspect of the present disclosure includes: a power storage device; an outlet configured to be connectable with an external device; an inverter that is provided between the power storage device and the outlet and that converts power of the power storage device into alternating current power; a switch that switches a conduction state between the power storage device and the outlet; and a control device that controls the inverter and the switch. When used power at the outlet becomes overloading, the control device controls the inverter or the switch to stop power supply to the outlet, and resumes the power supply to the outlet when a condition regarding a connection state between the outlet and the external device is satisfied.

According to the above configuration, with the power supply to the outlet being stopped, the power supply to the outlet is resumed when the condition regarding the connection state between the outlet and the external device is satisfied. The connection state between the outlet and the external device transitions with a user operation. Thus, by setting the condition regarding the connection state between the outlet and the external device as the condition for resuming the power supply to the outlet, the power supply to the outlet can be resumed at a timing intended by the user. Therefore, it is possible to restrain the external device from suddenly operating as the power supply to the outlet is resumed at a timing not intended by the user. Further, since a separate member such as a reset switch is not required, an increase in cost can be suppressed. That is, by setting the condition regarding the connection state between the outlet and the external device as the condition for resuming the power supply to the outlet, it is possible to resume the power supply to the outlet easily and appropriately.

(2) In an embodiment, when the connection state between the outlet and the external device transitions from a first state to a second state, the control device determines that the condition is satisfied. The first state is a state in which the external device is electrically connected to the outlet. The second state is a state in which the external device is not electrically connected to the outlet.

According to the above configuration, when the outlet and the external device are electrically disconnected, that is, when the external device is removed from the outlet, the power supply to the outlet is resumed. The user can remove the external device from the outlet and resume the power supply to the outlet at the intended timing.

(3) In an embodiment, when the connection state between the outlet and the external device transitions from a first state to a second state and then transitions to the first state again, the control device determines that the condition is satisfied. The first state is a state in which the external device is electrically connected to the outlet. The second state is a state in which the external device is not electrically connected to the outlet.

According to the above configuration, when the external device is removed from the outlet and the external device is connected to the outlet again, the power supply to the outlet is resumed. The user can remove the external device from the outlet and reconnect the external device to the outlet to resume the power supply to the outlet at the intended timing.

(4) In an embodiment, the switch is provided between the outlet and the inverter. The outlet includes a first outlet and a second outlet. The switch includes a first switch and a second switch. The first switch and the second switch are provided corresponding to the first outlet and the second outlet, respectively. When the used power at the outlet becomes overloading, the control device controls the switch corresponding to the outlet at which power increase has occurred most recently to stop the power supply to the outlet.

According to the above configuration, when the used power at the outlet becomes overloading, the power supply to the outlet at which power increase has occurred most recently is stopped. That is, the power supply to the outlet that caused the overload is stopped. This makes it possible to eliminate the overloading state, and to enable continuous use of other outlets while eliminating the overloading state.

(5) A vehicle according to another aspect of the present disclosure includes the power supply system according to any one of (1) to (4) above.

According to the above configuration, it is possible to resume the power supply to the outlet of the vehicle to which power supply is stopped, at a timing intended by a user.

(6) In an embodiment, the vehicle further includes a notification device that notifies information. When the power supply to the outlet is stopped, the control device controls the notification device to notify information indicating that the power supply to the outlet has been stopped.

When the used power at the outlet becomes overloading and the power supply to the outlet is stopped, there may be a case where the user cannot recognize the reason why the outlet cannot be used (for example, the outlet cannot be used due to the overload, the outlet cannot be used due to malfunction, etc.). According to the above configuration, with the notification of the information indicating that the power supply to the outlet has been stopped, the user can recognize that the outlet cannot be used because the overloading state is established. Therefore, the user convenience is improved.

(7) In an embodiment, the vehicle further includes a notification device that notifies information. When the power supply to the outlet is resumed, the control device controls the notification device to notify information indicating that the power supply to the outlet has been resumed.

According to the above configuration, the user can recognize that the power supply to the outlet has been resumed, with the notification. Therefore, the user convenience is improved.

According to the present disclosure, when the power supply to the outlet is stopped due to detection of an overload, the power supply to the outlet can be resumed easily and appropriately.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating the display screen of the display device (No. 2);

FIG. 4 is a flowchart showing a process procedure for shutting off the outlet;

FIG. 5 is a flowchart showing a process procedure for restoring the outlet; and

FIG. 6 is a flowchart showing a process procedure of the display process.

DETAILED DESCRIPTION OF EMBODIMENTS

Figure 1:
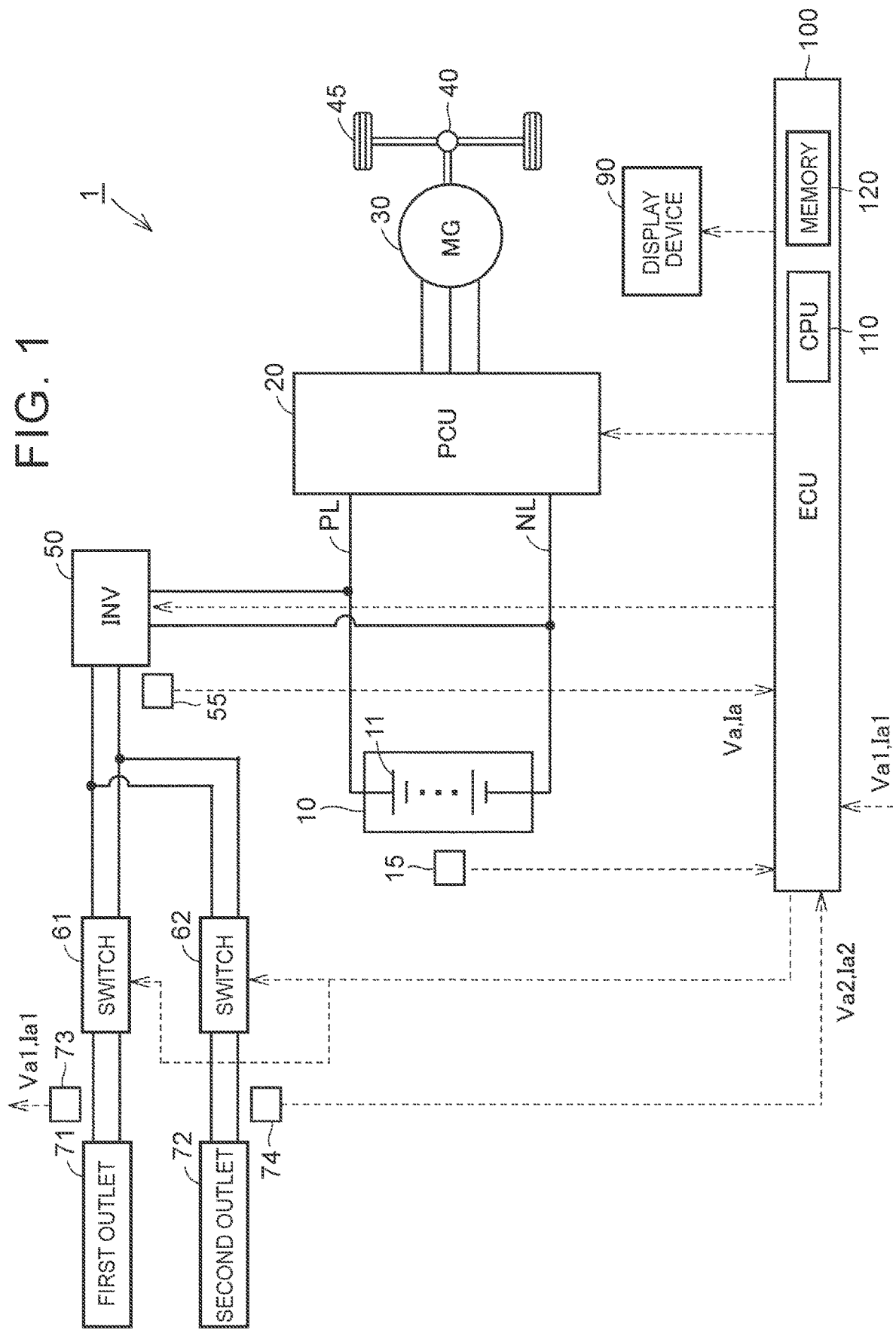
FIG. 1 is a diagram schematically showing an overall configuration of a vehicle including a power supply system according to an embodiment.

Hereinafter, embodiments of the present disclosure will be described in detail with reference to the drawings. It should be noted that the same or corresponding parts in the drawings are designated by the same reference characters and repetitive description will be omitted.

Overall Configuration of Vehicle

FIG. 1 is a diagram schematically showing an overall configuration of a vehicle 1 including a power supply system according to the present embodiment. The vehicle 1 according to the present embodiment is an electric vehicle. The vehicle 1 is not limited to an electric vehicle, and may be, for example, a plug-in hybrid vehicle, a hybrid vehicle, a fuel cell vehicle, or a vehicle having only an engine as a power source for traveling (so-called conventional vehicle).

With reference to FIG. 1, the vehicle 1 includes a battery 10, a monitoring unit 15, a power control device (hereinafter, also referred to as "power control unit (PCU)") 20, a motor generator 30, a transmission gear 40, drive wheels 45, an inverter 50, a sensor group 55, a first switch 61, a second switch 62, a first outlet 71, a second outlet 72, sensor groups 73, 74, a display device 90, and an electronic control unit (ECU) 100. The power supply system according to the present embodiment includes the battery 10, the inverter 50, the first switch 61, the second switch 62, the first outlet 71, the second outlet 72, and the ECU 100.

The battery 10 stores electric power for driving the vehicle 1. The battery 10 includes a plurality of stacked cells 11. The cell 11 is a secondary battery such as a nickel metal hydride battery or a lithium ion battery, for example. Further, the cell 11 may be a battery having a liquid electrolyte between a positive electrode and a negative electrode, or may be a battery having a solid electrolyte between a positive electrode and a negative electrode (all-solid-state battery). The battery 10 may be a large-capacity capacitor.

The positive electrode terminal of the battery 10 is electrically connected to the PCU 20 via a power line PL. The negative electrode terminal of the battery 10 is electrically connected to the PCU 20 via a power line NL.

The monitoring unit 15 monitors the state of the battery 10. Specifically, the monitoring unit 15 includes a voltage sensor that detects a voltage of the battery 10, a current sensor that detects a current input and output to and from the battery 10, and a temperature sensor that detects a temperature of the battery 10 (all not shown). Each of the above sensors outputs a signal indicating the detection result to the ECU 100.

The PCU 20 converts direct current (DC) power stored in the battery 10 into AC power and supplies the AC power to the motor generator 30 in response to a control signal from the ECU 100. The PCU 20 also converts AC power generated by the motor generator 30 into DC power and supplies the DC power to the battery 10.

The motor generator 30 is an AC rotating electric machine. The AC rotating electric machine includes, for example, a permanent magnet synchronous motor including a rotor in which permanent magnets are embedded. The motor generator 30 receives AC power from the PCU 20 to generate kinetic energy for driving the vehicle 1. The kinetic energy generated by the motor generator 30 is transmitted to the drive wheels 45 via the transmission gear 40. On the other hand, when decelerating the vehicle 1 or stopping the vehicle 1, the motor generator 30 converts the kinetic energy of the vehicle 1 into electrical energy. The AC power generated by the motor generator 30 is converted into DC power and supplied to the battery 10 by the PCU 20. As a result, regenerative power can be stored in the battery 10. In this way, the motor generator 30 is configured to generate a driving force or a braking force of the vehicle 1 with the transfer of electric power to and from the battery 10 (that is, charging/discharging of the battery 10).

When the vehicle 1 is configured as a hybrid vehicle further equipped with an engine (not shown) as a power source, the output of the engine can be used as a driving force for traveling in addition to the output of the motor generator 30. Alternatively, when the vehicle 1 is further equipped with a motor generator that generates power with the output of the engine, charging power of the battery 10 can also be generated with the output of the engine.

The inverter 50 is electrically connected to the power lines PL and NL. The inverter 50 converts the DC power of the battery 10 into a predetermined AC voltage (for example, AC 100 V) and an AC power having a predetermined frequency, and outputs the AC voltage and the AC power to the first outlet 71 and the second outlet 72.

The first outlet 71 and the second outlet 72 are AC connection portions for supplying AC voltage to AC electric devices (external devices). The external devices include, for example, hair dryers, hot plates, electric rice cookers, mobile terminal chargers, and the like. In the following, when the first outlet 71 and the second outlet 72 are not particularly distinguished, they may be simply referred to as "outlets".

The first switch 61 is provided between the first outlet 71 and the inverter 50. The first switch 61 performs switching between electrical connection and disconnection between the first outlet 71 and the inverter 50 in response to a control signal from the ECU 100.

The second switch 62 is provided between the second outlet 72 and the inverter 50. The second switch 62 performs switching between electrical connection and disconnection between the second outlet 72 and the inverter 50 in response to a control signal from the ECU 100.

When the first switch 61 and the second switch 62 are not particularly distinguished, they may be simply referred to as "switches".

The sensor group 55 includes a voltage sensor that detects an output voltage Va of the inverter 50 and a current sensor that detects an output current Ia of the inverter 50. Each of the above sensors outputs a signal indicating the detection result to the ECU 100.

The sensor group 73 includes a voltage sensor that detects an input voltage Va1 input from the inverter 50 to the first outlet 71, and a current sensor that detects an input current Ia1 input from the inverter 50 to the first outlet 71. Each of the above sensors outputs a signal indicating the detection result to the ECU 100.

The sensor group 74 includes a voltage sensor that detects an input voltage Va2 input from the inverter 50 to the second outlet 72, and a current sensor that detects an input current Ia2 input from the inverter 50 to the second outlet 72. Each of the above sensors outputs a signal indicating the detection result to the ECU 100.

The display device 90 displays various information about the vehicle 1 according to the control of the ECU 100. In the present embodiment, the display device 90 displays information on the usage status of the outlet and electric power and the like. The display mode of the display device 90 will be specifically described later with reference to FIGS. 2 and 3. The display device 90 may be, for example, a multi-information display of the vehicle 1, a navigation device, or a device provided independently of these.

The ECU 100 includes a central processing unit (CPU) 110, a memory 120, and an input/output port (not shown). The ECU 100 may be divided into a plurality of ECUs by function. The memory 120 includes a read-only memory (ROM) and a random access memory (RAM), and stores programs executed by the CPU 110 and the like. The CPU 110 loads the programs stored in the ROM into the RAM and executes the programs. The CPU 110 executes a predetermined calculation process based on various signals input from an input/output buffer and information stored in the memory 120 to control each device such that the vehicle 1 becomes a desired state based on the calculation result. Note that the control is not limited to software processing, but can also be constructed and processed by dedicated hardware (electronic circuits).

The ECU 100 is configured to be able to calculate a state of charge (SOC) of the battery 10 using the detection results of various sensors received from the monitoring unit 15. As a method for calculating the SOC, various known methods such as a method based on current value integration (Coulomb's count) and a method based on estimation of open circuit voltage (OCV) can be adopted.

Further, the ECU 100 detects connection of the external devices to the outlets. Specifically, for example, the outlets are each provided with a switch for detecting the connection of the external device, and the ECU 100 monitors the state (ON or OFF) of the switch to detect the connection of the external device to the outlet. The ECU 100 detects the connection state (electrically connected/electrically disconnected) of each of the first outlet 71 and the second outlet 72 with the external device.

The ECU 100 monitors power used at the outlets. Specifically, the ECU 100 monitors the output power of the inverter 50 and monitors the power used by the external devices connected to the outlets. More specifically, the ECU 100 calculates an output power Wa of the inverter 50 using the detection results Va and Ia of the sensor group 55.

The ECU 100 monitors the output power Wa of the inverter 50, and monitors whether power supply from the outlets to the external devices is overloading. For example, the ECU 100 compares the output power Wa of the inverter 50 with a predetermined upper limit power Wmax, and detects an overloading state when the output power Wa exceeds the upper limit power Wmax. The upper limit power Wmax is determined based on, for example, the specifications of the inverter 50 and is stored in the memory 120 of the ECU 100. The upper limit power Wmax may be, for example, the rated power of the inverter 50.

When an overloading state is detected, for example, it is conceivable to disconnect the inverter 50 from all the outlets (the first outlet 71 and the second outlet 72 in the present embodiment). However, in this case, all the external devices connected to the outlets become unusable. Further, in order to eliminate the overloading state, it is conceivable to disconnect the inverter 50 from the outlet that uses a large amount of power. However, in this case, by newly connecting the external device to the outlet and starting the use, the external device used up to that point may become unusable. In the following, electrically disconnecting the outlets and the inverter 50 by the switches is also simply referred to as "shutting off".

When an overloading state of the power used at the outlets is detected, the ECU 100 according to the present embodiment shuts off the outlet at which the power used has increased most recently. As a specific example, it is assumed that an external device is connected to the second outlet 72 to start using the second outlet 72 while using the first outlet 71, whereby an overloading state is established. In this case, the outlet at which the power used has increased most recently is the second outlet 72. Therefore, the ECU 100 controls the second switch 62 to disconnect the second outlet 72 and the inverter 50. As another specific example, it is assumed that the power used has increased at the first outlet 71 while external devices are connected to the first outlet 71 and the second outlet 72 for use, whereby an overloading state is established. In this case, the outlet at which the power used has increased most recently is the first outlet 71. Therefore, the ECU 100 controls the first switch 61 to disconnect the first outlet 71 and the inverter 50. In this way, by stopping the power supply to the outlet that caused the overload, the overloading state is eliminated and the outlet (external device) that had been in use until then can be continuously used.

The ECU 100 calculates the power used at the first outlet 71 using the detection results Va1 and Ia1 of the sensor group 73. The ECU 100 calculates the power used at the second outlet 72 using the detection results Va2 and Ia2 of the sensor group 74. The ECU 100 monitors the power used at the first outlet 71 and the second outlet 72, and identifies the outlet at which the power used has increased most recently based on the monitoring result.

Further, the ECU 100 shuts off all the outlets when the power of the battery 10 is depleted. Specifically, the ECU 100 shuts off all the outlets when the SOC falls below a predetermined SOC. The predetermined SOC may be set in advance, for example, or may be appropriately set by the user. When the outlets are shut off due to the depletion of the power of the battery 10, the restoration of the outlets described below is not performed.

Restoration of Shut off Outlet

In order to make the outlet that was disconnected from the inverter 50 due to detection of an overloading state usable again, it is necessary to control the switch and reconnect the outlet and the inverter 50 to restore the outlet. In the following, reconnecting the outlet disconnected from the inverter 50 due to detection of an overloading state to the inverter 50 to make the outlet usable again may be simply referred to as "restoration".

When restoring the outlet, for example, it is conceivable to automatically restore the outlet after a predetermined time has passed since shutting off the outlet. However, when the outlet is automatically restored, there may be a case where the external device that has been stopped suddenly operates at a timing not intended by the user, and a case where the outlet is restored with the overloading state being unsolved so the outlet is shut off again, resulting in repetition of shutoff and restoration. It is also conceivable to provide a reset switch for restoring the outlet, but in this case, the cost for providing the reset switch is high.

When a restoration condition is satisfied, the ECU 100 according to the present embodiment restores the outlet for which the restoration condition is satisfied. As the restoration condition, a condition related to the connection state between the outlet and the external device is adopted. For example, as the restoration condition, a condition can be adopted that the external device connected to the outlet is removed with the outlet being shut off. That is, the restoration condition is satisfied, when the connection state between the outlet and the external device transitions from a state in which the external device is electrically connected to the outlet (hereinafter, also referred to as "first state") to a state in which the external device is not electrically connected to the outlet (hereinafter, also referred to as "second state"), with the outlet being shut off.

By restoring the outlet when the restoration condition is satisfied, the outlet is restored in the state in which the external device is not connected to the outlet. Therefore, the external device can be connected to the outlet and operated at a timing intended by the user. That is, it is possible to restrain the stopped external device from suddenly operating at a timing not intended by the user. Further, since the outlet is restored by the operation of the user, it is possible to suppress the occurrence of a situation in which the outlet is automatically restored and shut off in a repeated manner. Further, in the case where the outlet is automatically restored, when the outlet is shut off while the vehicle 1 is traveling, for example, the user must remove the external device from the outlet to avoid the automatic restoration of the outlet. This may interfere with concentration on driving. The occurrence of such a situation can be suppressed with the continuation of the shutoff state of the outlet until the restoration condition is satisfied.

Further, since the operation of the external device with respect to the outlet is set as the restoration condition, it is not necessary to provide a further configuration (for example, the reset switch described above) for restoring the outlet. Therefore, the cost can be reduced compared with the case where a further configuration for restoring the outlet is provided.

Further, as the restoration condition, a condition may be adopted that the external device connected to the outlet is removed and then the external device is connected to the outlet, with the outlet being shut off. That is, in this case, the restoration condition is satisfied, when the connection state between the outlet and the external device transitions from the first state to the second state and then transitions from the second state to the first state, with the outlet being shut off.

In the above, by restoring the outlet when the restoration condition is satisfied, the outlet is restored when the external device is removed from the outlet and then the external device is connected to the outlet. The external device that is removed from the outlet and the external device that is connected to the outlet after that need not to be the same device. Since the outlet is restored when the user connects the external device to the outlet, the external device can be operated at a timing intended by the user. Thus, it is possible to restrain the stopped external device from suddenly operating at a timing not intended by the user. Further, since the outlet is restored by the operation of the user, it is possible to suppress the occurrence of a situation in which the outlet is automatically restored and shut off in a repeated manner. Further, in the case where the outlet is automatically restored, when the outlet is shut off while the vehicle 1 is traveling, for example, the user must remove the external device from the outlet to avoid the automatic restoration of the outlet. This may interfere with concentration on driving. The occurrence of such a situation can be suppressed with the continuation of the shutoff state of the outlet until the restoration condition is satisfied.

Further, since the operation of plugging and unplugging the external device with respect to the outlet is set as the restoration condition, it is not necessary to provide a further configuration for restoring the outlet. Therefore, the cost can be reduced compared with the case where a further configuration for restoring the outlet is provided.

Display on Display Device

For a user who intends to use external devices using the outlets in the vehicle 1, information indicating how much power can be used with the outlet (in other words, information indicating the amount of power that can be supplied from vehicle 1 to the outlet) and/or information indicating how much power is being used at the outlet is information of interest. Therefore, it is desirable to provide such information to the user. Further, when the outlet is shut off, it is desirable to provide the user with information indicating that the outlet has been shut off and/or which outlet has been shut off. Further, when the outlet is restored, it is desirable to provide the user with information indicating that the outlet has been restored and/or which outlet has been restored. Thus, in the present embodiment, the ECU 100 notifies the user of the above information. Specifically, the ECU 100 causes the display device 90 to display the above information. Hereinafter, a display screen of the display device 90 will be specifically described.

First, it is assumed that only the first outlet 71 is used. That is, a case is assumed that the first outlet 71 is used and the second outlet 72 is not used. In addition, "the outlet is used" means that an external device is electrically connected to the outlet. In addition, "the outlet is not used" means that an external device is not electrically connected to the outlet.

Figure 2:
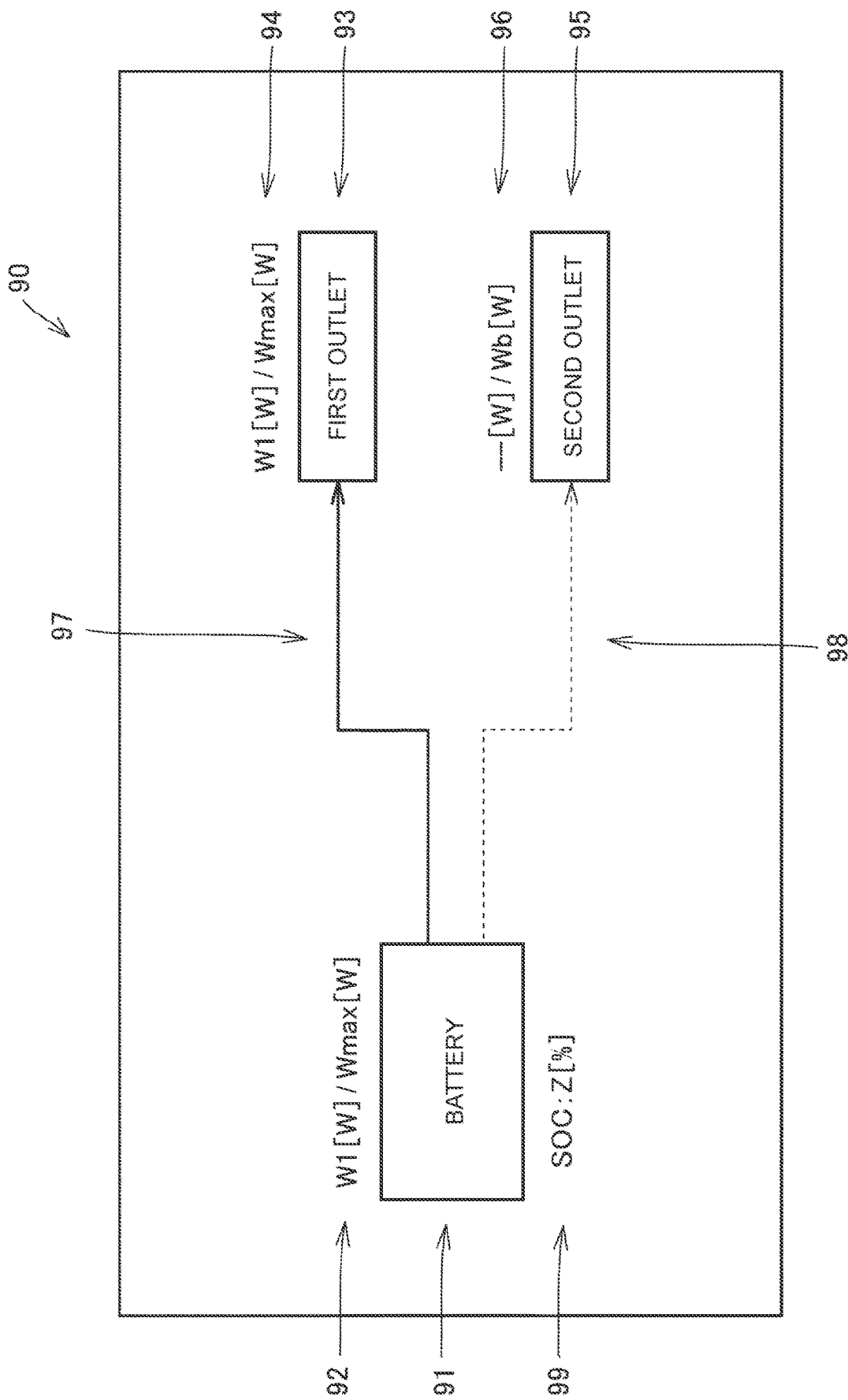
FIG. 2 is a diagram illustrating a display screen of a display device (No. 1)

FIG. 2 is a diagram illustrating the display screen of the display device 90. FIG. 2 illustrates a display screen for a case in which the first outlet 71 is used and the second outlet 72 is not used. With reference to FIG. 2, the display screen of the display device 90 includes a first display unit 91, a second display unit 92, a third display unit 93, a fourth display unit 94, a fifth display unit 95, a sixth display unit 96, a seventh display unit 97, and an eighth display unit 98.

The first display unit 91 displays characters indicating the battery 10 or an icon indicating the battery 10. In the present embodiment, the characters indicating the battery 10 are displayed on the first display unit 91.

The second display unit 92 displays the upper limit power Wmax that can be supplied from the battery 10 to the outlets as the denominator and the total power being supplied from the battery 10 to the outlets (that is, the output power Wa of the inverter 50) as the numerator. Specifically, the second display unit 92 displays, as the denominator, the rated power of the inverter 50 as the upper limit power Wmax that can be supplied to the outlets. The second display unit 92 displays, as the numerator, the output power Wa of the inverter 50 as the total power that is calculated using the detection results Va and Ia of the sensor group 55. In the example shown in FIG. 2, since only the first outlet 71 is used, the electric power W1 used in the first outlet 71 is displayed as the numerator on the second display unit 92.

The third display unit 93 displays characters indicating the first outlet 71 or an icon indicating the first outlet 71. In the present embodiment, the characters indicating the first outlet 71 are displayed on the third display unit 93.

The fourth display unit 94 displays the power that can be used at the first outlet 71 as the denominator and the power currently used at the first outlet 71 as the numerator. In the example shown in FIG. 2, since only the first outlet 71 is used, the fourth display unit 94 displays, as the denominator, the power equal to the upper limit power Wmax that can be supplied to the outlets as the power that can be used at the first outlet 71. The fourth display unit 94 displays, as the numerator, used power W1 at the first outlet 71 calculated using the detection results Va1 and Ia1 of the sensor group 73.

Regarding the display of the numerator on the fourth display unit 94, when the external device connected to the first outlet 71 is not used, that is, when the power used at the first outlet 71 is zero, the fourth display unit 94 displays zero. Further, the fourth display unit 94 indicates that the first outlet 71 is not used, when the first outlet 71 is not used, that is, when the external device is not connected to the first outlet 71. In this case, for example, "- - - [W]" is displayed as the numerator on the fourth display unit 94. The above display mode is similarly applied to the display of the numerator on the sixth display unit.

The fifth display unit 95 displays characters indicating the second outlet 72 or an icon indicating the second outlet 72. In the present embodiment, the characters indicating the second outlet 72 are displayed on the fifth display unit 95.

The sixth display unit 96 displays the power that can be used at the second outlet 72 as the denominator and the power currently used at the second outlet 72 as the numerator. Specifically, the sixth display unit 96 displays, as the denominator, a value Wb obtained by subtracting the used power W1 at the first outlet 71 from the upper limit power Wmax that can be supplied to the outlets as the power that can be used at the second outlet 72 (=Wmax−W1 (Wa)). In the example shown in FIG. 2, the second outlet 72 is not used. The sixth display unit 96 displays, as the numerator, an indication indicating that the second outlet 72 is not used. For example, "- - - [W]" is displayed as the numerator on the sixth display unit 96.

The seventh display unit 97 displays information on whether the first outlet 71 is used. When the first outlet 71 is used (when an external device is electrically connected to the first outlet 71), the seventh display unit 97 displays a solid arrow extending from the first display unit 91 to the third display unit 93. When the first outlet 71 is not used (when an external device is not electrically connected to the first outlet 71), the seventh display unit 97 displays a dotted arrow extending from the first display unit 91 to the third display unit 93. Alternatively, when the first outlet 71 is not used, the seventh display unit 97 need not display the arrow.

The seventh display unit 97 may display information on whether power is being supplied from the battery 10 to the first outlet 71. In this case, when power is being supplied from the battery 10 to the first outlet 71, the seventh display unit 97 displays the solid arrow extending from the first display unit 91 to the third display unit 93. When power is being supplied from the battery 10 to the first outlet 71, the seventh display unit 97 displays the dotted arrow extending from the first display unit 91 to the third display unit 93. Alternatively, when power is not being supplied from the battery 10 to the first outlet 71, the seventh display unit 97 need not display the arrow.

The eighth display unit 98 displays information on whether the second outlet 72 is used. When the second outlet 72 is used (when an external device is electrically connected to the second outlet 72), the eighth display unit 98 displays a solid arrow extending from the first display unit 91 to the fifth display unit 95. When the second outlet 72 is not used (when an external device is not electrically connected to the second outlet 72), the eighth display unit 98 displays a dotted arrow extending from the first display unit 91 to the fifth display unit 95. Alternatively, when the second outlet 72 is not used, the eighth display unit 98 need not display the arrow.

The eighth display unit 98 may display information on whether power is being supplied from the battery 10 to the second outlet 72. In this case, when power is being supplied from the battery 10 to the second outlet 72, the eighth display unit 98 displays the solid arrow extending from the first display unit 91 to the fifth display unit 95. When power is not being supplied from the battery 10 to the second outlet 72, the eighth display unit 98 displays the dotted arrow extending from the first display unit 91 to the fifth display unit 95. Alternatively, when power is not being supplied from the battery 10 to the second outlet 72, the eighth display unit 98 need not display the arrow.

With the display on the display screen as described above, the user can obtain various information. For example, the user can recognize the power that can be used with the outlets (upper limit power Wmax), with the display of the second display unit 92. The user can also recognize how much of the usable power (upper limit power Wmax) is currently used with the display of the second display unit 92.

The user can also recognize the power used in the first outlet 71 with the display of the fourth display unit 94. The user can also recognize the power used in the second outlet 72 with the display of the sixth display unit 96. The user can also visually recognize whether the first outlet 71 is being used or whether the power is being supplied from the battery 10 to the first outlet 71 with the display of the seventh display unit 97. The user can also visually recognize whether the second outlet 72 is being used or whether the power is being supplied from the battery 10 to the second outlet 72 with the display of the eighth display unit 98.

Next, it is assumed that the user connects an external device to the second outlet 72 and starts using the second outlet 72 with only the first outlet 71 being used. That is, in this case, both the first outlet 71 and the second outlet 72 are used.

FIG. 3 is a diagram illustrating the display screen of the display device 90. FIG. 3 illustrates a display screen when both the first outlet 71 and the second outlet 72 are used.

When the second outlet 72 is used, the eighth display unit 98 displays a solid arrow extending from the first display unit 91 to the fifth display unit 95. In addition, the sixth display unit 96 displays used power W2 at the second outlet 72 calculated using the detection results Va2 and Ia2 of the sensor group 74.

Here, by using the second outlet 72, the power used at the outlet may be overloading. Specifically, for example, the sum of the used power W1 at the first outlet 71 and the used power W2 at the second outlet 72 may exceed the upper limit power Wmax that can be supplied from the battery 10 to the outlets (W1+W2>Wmax). More specifically, the used power W2 at the second outlet 72 may exceed the power Wb that can be used at the second outlet 72 (W2>Wb). In such a case, as described above, the second outlet 72 at which power increase has occurred most recently is shut off. Along with this, the eighth display unit 98 displays the dotted arrow. Alternatively, the eighth display unit 98 does not display the arrow. The user can recognize that the second outlet 72 has been shut off with the change in the display mode on the eighth display unit 98.

Further, when the second outlet 72 is shut off, the sixth display unit 96 changes the display color or the background color of the information. Specifically, the sixth display unit 96 changes the display color or the background color of the information depending on whether the second outlet 72 is shut off or the second outlet 72 is not shut off. Thereby, the user can visually recognize that the second outlet 72 has been shut off. Further, when the second outlet 72 is shut off, the fifth display unit 95 may change the display mode. For example, the fifth display unit 95 changes the display color of characters in the case of displaying characters, and changes the display mode of the icon in the case of displaying an icon. Thereby, the user can visually recognize that the second outlet 72 has been shut off.

Further, the sixth display unit 96 maintains the display content displayed when the second outlet 72 is shut off. That is, the sixth display unit 96 maintains the display of the power Wb that can be used at the second outlet 72 as the denominator and the used power W2 (>Wb) at the second outlet 72 as the numerator, even when the second outlet 72 is shut off. When the display content is maintained by the sixth display unit 96, the user can recognize how much the excess of power was.

In the above, the example in which the power used at the second outlet 72 has increased most recently is described. However, even when the power used at the first outlet 71 has increased most recently, the third display unit 93, the fourth display unit 94, and the seventh display unit 97 perform display in the same modes as with the fifth display unit 95, the sixth display unit 96, and the eighth display unit 98, respectively.

The display screen of the display device 90 may further include a ninth display unit 99. The ninth display unit 99 displays the SOC of the battery 10. For example, there may be a case in which the power supply to the outlets cannot be performed due to depletion of the power of the battery 10. When the power of the battery 10 is depleted, the first outlet 71 and the second outlet 72 are shut off, and the dotted arrows are displayed by the seventh display unit 97 and the eighth display unit 98. However, there may be a case where the user cannot be aware of the reason why the first outlet 71 and the second outlet 72 are shut off. Therefore, with the display of the SOC of the battery 10 by the ninth display unit 99, the user can recognize that the outlets have been shut off due to depletion of the power of the battery 10.

Process Executed by ECU

FIG. 4 is a flowchart showing a process procedure for shutting off the outlet. The flowchart is called from the main routine when the ECU 100 is started, and is executed by the ECU 100. Each step (hereinafter, abbreviated as "S") of the flowchart of FIG. 4 and flowcharts of FIGS. 5 and 6 described later is basically implemented by software processing by the ECU 100. However, part of or all of the steps may be implemented by dedicated hardware (electrical circuit) provided in the ECU 100.

The ECU 100 determines whether the power used at the outlets is overloading (S1). When no overload is detected (NO in S1), the ECU 100 advances the process to S13.

On the other hand, when an overload is detected (YES in S1), the ECU 100 identifies the outlet at which the used power has increased most recently (S3). Then, the ECU 100 controls the switch corresponding to the identified outlet to shut off the outlet (S5).

The ECU 100 determines whether the overloading state has been eliminated by shutting off the outlet in S5 (S7). When determining that the overloading state has been eliminated (YES in S7), the ECU 100 advances the process to S13.

On the other hand, when determining that the overloading state has not been eliminated (NO in S7), the ECU 100 identifies the outlet at which power increase has occurred most recently, out of the outlets that have not been shut off at this point (S9). Then, the ECU 100 controls the switch corresponding to the identified outlet to shut off the outlet (S11). Then, the ECU 100 returns the process to S7 and determines again whether the overloading state has been eliminated. When the overloading state has not been eliminated, the ECU 100 repeatedly executes the processes S9 and S11 until the overloading state is eliminated. Then, when the overloading state is eliminated, the ECU 100 executes a display process (S13).

FIG. 5 is a flowchart showing a process procedure for restoring the outlet. The process of the flowchart is started by the ECU 100 when any of the outlets is shut off, and is executed in parallel with the process of the flowchart of FIG. 4. That is, when the outlet is shut off, the ECU 100 starts the process of the flowchart of FIG. 5 and executes the process in parallel with the process of the flowchart of FIG. 4 in order to determine whether to restore the outlet.

The ECU 100 monitors whether the restoration condition is satisfied (S21). When the restoration condition is not satisfied (NO in S21), the ECU 100 shifts the process to return.

On the other hand, when the restoration condition is satisfied (YES in S21), the ECU 100 restores the outlet for which the restoration condition is satisfied (S23).

FIG. 6 is a flowchart showing a process procedure of the display process. The ECU 100 determines whether there is a shut off outlet (S130).

When there is no shut off outlet (NO in S130), the ECU 100 calculates the power used at each outlet and the total power (S134). Then, the ECU 100 updates the content to be displayed on the display device 90 (S136) based on the calculation result in S134, and causes the display device 90 to display the updated content (S138).

On the other hand, when there is a shut off outlet (YES in S130), the ECU 100 maintains the display content (usable power and currently used power) for the shut off outlet, and notifies that the outlet has been shut off (S132). As an example, when the first outlet 71 is shut off, the display content of the fourth display unit 94 is maintained, the display color of the third display unit 93 is changed, and the dotted arrow is displayed by the seventh display unit 97.

Next, the ECU 100 advances the process to S134 and calculates the power used at the outlet that is not shut off and the total power (S134). Then, the ECU 100 updates the content to be displayed by the display device 90 regarding the outlet that is not shut off (S136) based on the calculation result in S134, and causes the display device 90 to display the updated content (S138).

As described above, in the power supply system according to the present embodiment, when an overload of the power used at the outlets is detected, the outlet at which the used power has increased most recently is shut off. By stopping the power supply to the outlet that caused the overload, the overloading state is eliminated and the outlet (external device) that had been in use until then can be continuously used.

When the restoration condition is satisfied with the outlet being shut off, the power supply system according to the present embodiment restores the outlet for which the restoration condition is satisfied. For example, as the restoration condition, a condition can be adopted that the external device connected to the outlet is removed with the outlet being shut off. In this case, the outlet is restored with no external device connected to the outlet. Further, as the restoration condition, a condition may be adopted that the external device connected to the outlet is removed and then the external device is connected to the outlet, with the outlet being shut off. In this case, when the external device is removed from the outlet and then the external device is connected to the outlet, the outlet is restored. When any of the restoration conditions is satisfied, the user can restore the outlet at the intended timing. Thus, it is possible to restrain the stopped external device from suddenly operating at a timing not intended by the user. Further, since the outlet is restored by the operation of the user, it is possible to suppress the occurrence of a situation in which the outlet is automatically restored and shut off in a repeated manner. Further, since the operation of the external device with respect to the outlet is set as the restoration condition, it is not necessary to provide a further configuration for restoring the outlet.

First Modification

In the embodiment, an example of supplying power of the battery 10 to the outlet has been described. However, the power supplied to the outlet is not limited to the power of the battery 10. For example, although not shown, power of the auxiliary battery that supplies power to auxiliary devices of the vehicle 1 may be supplied to the outlet.

Second Modification

In the embodiment and the first modification, an example in which one inverter 50 is provided for a plurality of outlets (first outlet 71, second outlet 72) has been described. However, an inverter may be provided for each of the outlets. That is, the power supply system may include a plurality of outlets and a plurality of inverters, and each of the outlets may be provided with the inverter. Thus, the ECU 100 can control the inverters to stop and resume the power supply to the outlets.

Third Modification

In the embodiment and the first and second modifications, an example of displaying the information with the display device 90 has been described as a mode of notifying the user of various information (for example, information indicating the power that can be supplied from the vehicle 1 to the outlets, information indicating how much power is used at the outlets, and information indicating which of the outlets is shut off). However, the mode of notifying information is not limited to the display. For example, the vehicle may be further equipped with an audio device to notify various information by audio.

Fourth Modification

In the embodiment and the first, second, and third modifications, an example in which the power supply system includes two outlets (first outlet 71 and second outlet 72) has been described. However, the number of outlets provided in the power supply system is not limited to two. The number of outlets provided in the power supply system may be one, or three or more.

The embodiment disclosed herein should be considered as illustrative and not restrictive in all respects. The scope of the present disclosure is shown by the claims, rather than the above embodiment, and is intended to include all modifications within the meaning and the scope equivalent to those of the claims.

What is claimed is:

1. A power supply system comprising:
a power storage device;
an outlet configured to be connectable with an external device;
an inverter that is provided between the power storage device and the outlet, the inverter being configured to convert electric power of the power storage device into alternating current power;
a switch configured to switch a conduction state between the power storage device and the outlet; and
a control device configured to control the inverter and the switch, wherein
the control device is configured to, when used power at the outlet becomes overloading, control the inverter or the switch to stop power supply to the outlet,
the control device is configured to, when a condition regarding a connection state between the outlet and the external device is satisfied, resume the power supply to the outlet,
the switch is provided between the outlet and the inverter,
the outlet includes a first outlet and a second outlet,
the switch includes a first switch and a second switch,
the first switch and the second switch are provided corresponding to the first outlet and the second outlet, respectively, and
the control device is configured to, when the used power at the outlet becomes overloading, control the switch corresponding to the outlet at which power increase has occurred most recently to stop the power supply to the outlet.

2. The power supply system according to claim 1, wherein:
the control device is configured to, when the connection state between the outlet and the external device transitions from a first state to a second state, determine that the condition is satisfied;
the first state is a state in which the external device is electrically connected to the outlet; and
the second state is a state in which the external device is not electrically connected to the outlet.

3. The power supply system according to claim 1, wherein:
the control device is configured to, when the connection state between the outlet and the external device transitions from a first state to a second state and then transitions to the first state again, determine that the condition is satisfied;
the first state is a state in which the external device is electrically connected to the outlet; and
the second state is a state in which the external device is not electrically connected to the outlet.

4. A vehicle comprising the power supply system according to claim 1.

5. The vehicle according to claim 4, further comprising:
a notification device configured to notify information, wherein the control device is configured to, when the power supply to the outlet is stopped, control the notification device to notify information indicating that the power supply to the outlet has been stopped.

6. The vehicle according to claim 4, further comprising a notification device configured to notify information, wherein the control device is configured to, when the power supply to the outlet is resumed, control the notification device to notify information indicating that the power supply to the outlet has been resumed.

* * * * *